Patented Nov. 11, 1952

2,617,150

UNITED STATES PATENT OFFICE 2,617,150

COMPRESSION MOLDING OF PERFLUOROCHLOROCARBON PLASTICS

Louis C. Rubin, West Caldwell, N. J., assignor to The M. W. Kellogg Company, Jersey City, N. J., a corporation of Delaware No Drawing. Application December 31, 1949, Serial No. 136,401

12 Claims. (Cl. 18—55)

This invention relates to the treatment of perfluorochlorocarbon plastics. In one aspect, the invention relates to the treatment of polytrifluorochloroethylene plastics. In another aspect, the invention relates to the compression molding of polymers of trifluorochloroethylene for the purpose of forming articles of such material.

The preparation of the monomer, trifluorochloroethylene, is accomplished by dechlorinating Freon 113 (1, 1-2 trifluorotrichloroethane), under suitable conditions of dehalogenation in the presence of a solvent, such as methyl alcohol, and a metallic dehalogenating agent, such as zinc dust, to produce an effluent comprising the monomer trifluorochloroethylene, including unreacted trifluorochloroethylene and solvent. This effluent is next passed to a suitable fractional distillation system in which substantially pure trifluorochloroethylene is recovered as a relatively low boiling fraction.

The monomer thus obtained is polymerized under suitable polymerization conditions, with or without the presence of a suitable catalyst or promoter. Such conditions may comprise the use of a suitable catalyst comprising an organic peroxide, such as bis-trichloroacetyl peroxide preferably dissolved in a suitable solvent, such as trichlorofluoromethane, at a temperature between about $-20°$ C. and about $25°$ C., and preferably at a temperature of about $-16°$ C. At a temperature of about $-16°$ C. the polymerization of trifluorochloroethylene to the solid polymer in a suitable yield is accomplished in about seven days. At elevated temperatures, less time is required to complete the polymerization. After the desired extent of polymerization, the resulting polymerization reaction mixture is removed from the polymerization zone and the polymeric product is recovered from the solvent for the catalyst or polymerizing agent.

The polymers of trifluorochloroethylene possess certain desirable, physical and chemical characteristics, with four-fifths of the weight being supplied by the halogens, fluorine and chlorine. These polymers are colorless and transparent, and have been found to possess a high chemical stability, with no effect being observed on the polymer after prolonged exposure to concentrated sulfuric, hydrofluoric and hydrochloric acid, strong caustic, fuming nitric acid, aqua regia, and other vigorous oxidizing materials. The polymer is hard but not brittle and is flowable at temperatures above about $500°$ F. In addition, the polymer is flexible and resilient, and is not wetted by water or affected by high humidity.

However, great care and a novel method of molding are required in forming molded articles of these plastics, inasmuch as they tend to change their physical characteristics to varying degrees under the influence of the molding temperature.

It is an object of this invention to provide an improved method of compression molding adapted to the forming of articles of polymers of trifluorochloroethylene.

Various other objects and advantages of the present invention may be apparent to those skilled in the art from the accompanying description and disclosure.

According to this invention, employing suitable compression molding apparatus as more specifically hereinafter described, a plastic composed essentially of polytrifluorochloroethylene, prepared in granular or powdered form in accordance with the practice followed in the preparation of other plastic materials for molding, is placed in a die, and the die is maintained at a suitable temperature between about $415°$ F. and about $625°$ F. and under suitable compacting pressure between about 500 and 25,000 pounds per square inch, for a time sufficient to permit the plastic to assume the internal contour of the die and attain the size and shape of the desired article. The die is subsequently cooled and the formed article is then removed.

The production of polytrifluorochloroethylene by the previously described process has been found to result in the formation of polymers of varying molecular weights. It has, therefore, been found that the optimum operating conditions employed for forming the desired articles from the plastic polymer will be governed to a large extent by the molecular weight of the polymer produced. It has also been found, however, in practice that it is impractical to ascertain these molecular weights under normal circumstances. Accordingly, a sample test has been devised which provides a direct indication of the proper molding temperature. This test comprises measurements of the temperature at which no tensile strength is exhibited under the conditions of the test. This test is applied to standard or test pieces of the plastic material. The temperature is referred to as the "no strength temperature" or "no strength temperature value", and is abbreviated N. S. T. Accordingly, the N. S. T. value serves as a useful guide in the molding of plastics, and has particular applicability to plastics composed essentially of polytrifluorochloroethylene.

The measurement of the N. S. T. value is carried out in suitable apparatus on a strip of the plastic measuring 2" by 1/8" by 1/8". Conveniently such strips may be notched or grooved in a straight line across one large surface at the center transversally to the longitudinal axis. The notch or groove is made perfectly straight and extended to a depth of 1/64". The strength test is then applied to the point of minimum cross-section. The sample is suspended vertically, with a small weight (approximately 4" long), suspended from the lower end of the test strip on a fine wire. The above-mentioned weight is so adjusted that the total weight from the notch down is 0.5 gram. The test piece is suspended in a suitable chamber whose internal temperature is brought up to 410° F. The temperature is then raised at a rate of 2.7° F. per minute until the sample pulls apart at the notch. The N. S. T. value is the temperature at which the test strip is pulled in two. This determination is not highly sensitive to small variations in test strip thickness (±0.003"). However care must be taken to cut a sharp clean notch of uniform depth. Differences of 10° F. are normally considered significant.

In carrying out the molding operation of polytrifluorochloroethylene under the aforementioned conditions of temperature and pressure, the optimum operating conditions are determined by the particular N. S. T. value of the polytrifluorochloroethylene plastic treated. In this respect, it has been found that the N. S. T. value of the polytrifluorochloroethylene plastic may from about 220° C. to about 350° C. and that the polymers falling within this range of N. S. T. values may be satisfactorily treated under the above range of operating conditions. In general, it has been found that as the N. S. T. value increases, the die temperature should also be increased (with the pressure remaining constant) to insure the best results. In a given instance the pressure employed is that which is required to mold the material in a sufficiently short time at the temperature selected. It will be found that the pressure required in molding at the temperatures in the aforementioned range will fall within the range between about 700 and about 1,400 pounds per square inch, although in certain instances pressures as low as 500 or as high as 25,000 pounds per square inch may also be employed. Thus, maintaining compacting pressure on the die between about 700 and about 1,400 pounds per square inch in each instance, it has been found that a polytrifluorochloroethylene plastic having an N. S. T. value of 240° C. can be satisfactorily pressed at temperatures of between about 445° F. and about 500° F., while a polymer having an N. S. T. value of 270° C. is satisfactorily pressed at temperatures between about 465° F. and about 535° F. Similarly, polymers having an N. S. T. value of 300° C. are satisfactorily pressed at temperatures between about 480° F. and about 590° F. The polytrifluorochloroethylene plastic having a relatively low N. S. T. value, such as 240° C., flows easier at the molding temperature and produces a relatively harder finished article, while the polymers having a relatively high N. S. T. value, such as 300° C., are more viscous at the molding temperature but produce a more flexible finished article.

The particular pressing time required for completely converting the stock and forming the finished article under selected operating conditions of temperature and pressure and based upon the respective N. S. T. value, is determined by the thickness of the polytrifluorochloroethylene article to be formed. The following table will serve as a guide for determining suitable pressing periods for the various thicknesses of the polytrifluorochloroethylene plastic stock and grades of material, and represents data obtained when fabricating 2¼" discs of the polytrifluorochloroethylene plastic within a suitable die.

N. S. T. value _____ ° C__300 270 240
Molding temperature _____ ° F__480 480 480

| Thickness in Inches | Pressing Time in Minutes | | |
|---|---|---|---|
| 0.2 | 10 | 7 | 5 |
| 0.4 | 25 | 20 | 12 |
| 0.6 | 40 | 28 | 20 |
| 0.8 | 55 | 40 | 28 |
| 1.0 | 65 | 50 | 36 |

From the above table, it will be noted that as the N. S. T. value of the polytrifluorochloroethylene plastic increases, the molding or pressing time for a given thickness is also increased; and that for a given N. S. T. value of the plastic, the pressing time is also increased with an increase in thickness. It will also be noted that as the pressing temperature is raised, the pressing time will decrease. Thus, for example, a polytrifluorochloroethylene plastic having an N. S. T. value of 300° C. can be pressed in one-half the time at 570° C., which approaches the upper limit of the preferred die temperature range of 480° F.–590° F., for a plastic having the aforementioned N. S. T. value of 300° C.

In the description of the operating conditions for the above-mentioned compression molding procedure, the stock to be treated has been referred to as a plastic composed essentially of polytrifluorochloroethylene. It should be understood, however, that fillers and plastic compositions other than the polymers of the present invention which do not materially affect the characteristics of polytrifluorochloroethylene may also be incorporated in the plastic material treated, and that the treatment of such compositions is also within the scope of this invention. In this respect it has also been found desirable to incorporate plasticizing agents with the polytrifluorochloroethylene plastic to be molded, employing such plasticizers as polytrifluorochloroethylene itself but in an oily or waxy state. When incorporating such plasticizing agents with the polytrifluorochloroethylene plastic to be molded, it is possible to employ the lower temperatures within the aforementioned ranges for a given N. S. T. value of polytrifluorochloroethylene. From an economic standpoint, it is generally preferred to conduct the molding operation at as low a temperature as possible.

In carrying out the aforementioned compression molding of polytrifluorochloroethylene plastics, conventional compression molding apparatus is employed which is familiar to those skilled in the art, and since the novelty of the present invention does not reside in the molding apparatus employed, further description thereof is unnecessary. It is preferred, however, that the platens be electrically heated, either by resistance, induction or dielectric heating; and while a separate set of platens may be utilized for subsequent cooling of the die after the stock has been completely converted, it is preferred that one set of platens having both heating and cooling means be employed for efficient operation. The die employed is preferably a high-alloy steel or chromium plated high temperature steel.

In conducting the molding operation, a previously determined weight of the polytrifluorochloroethylene plastic stock, preferably in granular form, is placed in the die. The stock may be placed in the die with the latter at room temperature, but it is preferred that the die be first brought up to a temperature between about 225° F. and about 300° F., before the actual molding cycle is begun, in order to avoid possible abrasion of the inner surfaces of the die by contact with the relatively rough polytrifluorochloroethylene plastic granules and also to reduce the time required to plasticize the polymer in the actual molding operation. If so desired, the stock may be separately preheated in an oven at a temperature substantially below the conversion temperature. Temperatures between about 225° F. and about 300° F. are preferred, and it is desirable to hold the stock at such temperature for about one hour. The temperatures required for carrying out the molding operation are measured at the molding surface of the die.

After the stock has been placed in the die, and is at the proper temperature, the die is slowly closed under a pressure of approximately 200 pounds per square inch on the stock. When the combined application of heat and pressure causes the granular structure to collapse or coalesce, more pressure is applied. When using a hydraulic or pneumatic means, such collapse or coalescense is indicated by a drop in pressure in the chamber. The pressure is next slowly raised to the desired molding pressure which may vary from between about 500 and about 25,000 pounds per square inch, although a pressure between about 700 and about 1,400 pounds per square inch is preferred. In raising the pressure to the desired molding pressure, the ram speed is preferably maintained at approximately $\frac{3}{16}''$ per minute. The desired molding pressure is maintained on the stock until the die is completely closed and all of the stock is completely converted. The aforementioned table may be employed as a guide for determining the pressing period required for effecting the conversion.

As previously indicated, the die is next cooled and the formed article is ejected. Cooling of the die may be merely that which is caused by contact of the die with the atmosphere, but it is desirable in some instances to cool the die rapidly in order to limit crystallization. Such limitations of the degree of crystallization will affect the physical properties of the molded article produced from the polytrifluorochloroethylene plastic. These properties have been found to vary from those of an amorphous material to those of a crystalline material. The amorphous material is transparent, softer, tougher and more flexible than the crystalline material. The latter tends to be milky in appearance and hard and resistant to distortion. The degree of crystallization is determined primarily by the rapidity with which the molded polymer is cooled, or quenched, to approximately 300° F. from its transition temperature. The melt viscosity of the polymer being molded will affect the rate of crystallization, so that the higher the N. S. T. value, the lower the rate of crystallization. Similarly, when the N. S. T. value is lowered, the rate of crystallization will be more rapid, hence more rapid cooling is necessary if it is desired to avoid or limit crystallization. For example, quenched polytrifluorochloroethylene plastic having an N. S. T. value of 220° C., while flexible and useful as a film at room temperature, will crystallize fairly rapidly at temperatures as low as 250° F. and become brittle. Quenched polytrifluorochloroethylene plastic with an N. S. T. value of 270° C. will show comparatively little change on heating to the same temperature for prolonged periods; and even if crystallized by heating at relatively higher temperatures, still retains its toughness.

In cooling the die rapidly in order to limit crystallization, it is preferred to employ low pressure steam as an initial coolant, followed by water. In order to avoid shrinkage and to maintain the desired shape of the article, after the cooling water is turned on, the pressure is quickly raised above the molding pressure to pressures as high as about 35,000 pounds per square inch on the stock. When operating in the preferred molding pressure range between about 700 and about 1,400 pounds per square inch, it is desirable to raise the pressure to between about 7000 and about 10,000 pounds per square inch. After the pressure has been raised on the stock to the desired point, it is slowly allowed to drop to between about 2000 and about 3000 pounds per square inch by the time the die has reached a temperature between about 70° F. and about 350° F., although a temperature of approximately 250° F. is normally sufficiently low to permit the removal of the finished article. The die is then opened and the finished article is ejected.

While a particular embodiment of the invention has been described for purposes of illustration, it should be understood that various modifications and adaptations thereof, which will be obvious to one skilled in the art, may be made within the spirit of the invention without departing from its scope.

I claim:

1. A method for forming articles from a plastic composed essentially of polytrifluorochloroethylene having an N. S. T. value between about 220° C. and about 350° C. which comprises placing said plastic in a die, maintaining said die at a temperature between about 415° F. and about 625° F. under compacting pressure between about 500 and about 25,000 pounds per square inch for a time sufficient to permit said plastic to assume the internal contour of said die and attain the size and shape of the desired article, after forming said plastic article in said die in the aforementioned step cooling said article to a temperature below 350° F. and during said cooling operation raising the pressure on said article at least initially above said last-mentioned compacting pressure, and thereafter recovering said formed article from said die.

2. A method for forming articles from a plastic composed essentially of polytrifluorochloroethylene having an N. S. T. value between about 220° C. and about 350° C. which comprises placing said plastic in a die, maintaining said die at a temperature between about 415° F. and about 625° F. under compacting pressure between about 500 and about 25,000 pounds per square inch for a time sufficient to permit said plastic to assume the internal contour of said die and attain the size and shape of the desired article, after forming said plastic article in said die in the aforementioned step cooling said article to a temperature between about 70° F. and about 350° F. and during said cooling operation raising the pressure on said article above said last-mentioned compacting pressure at least initially above 500 and not higher than about 35,000 pounds per square inch, and thereafter recovering said formed article from said die.

3. A method for forming articles from a plastic composed essentially of polytrifluorochloroethylene having an N. S. T. value between about 240° C. and about 300° C. which comprises placing said plastic in a die, maintaining said die at a temperature between about 445° F. and about 590° F. under compacting pressure between about 700 and about 1,400 pounds per square inch for a time sufficient to permit said plastic to assume the internal contour of said die and attain the size and shape of the desired article, after forming said plastic article in said die in the aforementioned step cooling said article to a temperature between about 70° F. and about 350° F. and during said cooling operation raising the pressure on said article at least initially to between about 7,000 and about 10,000 pounds per square inch, and thereafter recovering said formed article from said die.

4. A method for forming articles from a plastic composed essentially of polytrifluorochloroethylene having an N. S. T. value of about 240° C. and about 300° C. which comprises placing said plastic in a die, maintaining said die at a temperature between about 445° F. and about 590° F. under compacting pressure between about 700 and about 1,400 pounds per square inch for a time sufficient to permit said plastic to assume the internal contour of said die and attain the size and shape of the desired article, after forming said plastic article in said die in the aforementioned step cooling said article to a temperature of about 250° F. and during said cooling operation raising the pressure on said article at least initially to between about 7,000 and about 10,000 pounds per square inch, and thereafter recovering said formed article from said die.

5. A method for forming articles from a plastic composed essentially of polytrifluorochloroethylene having an N. S. T. value of about 300° C. which comprises placing said plastic in a die, maintaining said die at a temperature between about 480° F. and about 590° F. under compacting pressure between about 700 and about 1,400 pounds per square inch for a time sufficient to permit said plastic to assume the internal contour of said die and attain the size and shape of the desired article, after forming said plastic article in said die in the aforementioned step cooling said article to a temperature of about 250° F. and during said cooling operation raising the pressure on said article at least initially to between about 7,000 and about 10,000 pounds per square inch, and thereafter recovering said formed article from said die.

6. A method for forming articles from a plastic composed essentially of polytrifluorochloroethylene having an N. S. T. value of about 270° C. which comprises placing said plastic in a die, maintaining said die at a temperature between about 465° F. and about 535° F. under compacting pressure between about 700 and about 1,400 pounds per square inch for a time sufficient to permit said plastic to assume the internal contour of said die and attain the size and shape of the desired article, after forming said plastic article in said die in the aforementioned step cooling said article to a temperature of about 250° F. and during said cooling operation raising the pressure on said article at least initially to between about 7,000 and about 10,000 pounds per square inch, and thereafter recovering said formed article from said die.

7. A method for forming articles from a plastic composed essentially of polytrifluorochloroethylene having an N. S. T. value of about 240° C. which comprises placing said plastic in a die, maintaining said die at a temperature between about 445° F. and about 500° F. under compacting pressure between about 700 and about 1,400 pounds per square inch for a time sufficient to permit said plastic to assume the internal contour of said die and attain the size and shape of the desired article, after forming said plastic article in said die in the aforementioned step cooling said article to a temperature of about 250° F. and during said cooling operation raising the pressure on said article at least initially to between about 7,000 and about 10,000 pounds per square inch, and thereafter recovering said formed article from said die.

8. A method for forming articles from a plastic composed essentially of polytrifluorochloroethylene having an N. S. T. value between about 220° C. and about 350° C. which comprises: placing said plastic in a die; maintaining said die at a temperature between about 415° F. and about 625° F., the molding temperature within said range being related to the N. S. T. value whereby temperatures above 480° F. are employed when said plastic has an N. S. T. value not lower than about 300° C. and temperatures not higher than 500° F. are employed when said plastic has an N. S. T. value not higher than about 240° C.; maintaining said die at the selected temperature under compacting pressure between about 700 and about 1,400 pounds per square inch for a time sufficient to permit said plastic to assume the internal contour of said die and attain the size and shape of the desired article; after forming said plastic article in said die in the aforementioned step cooling said article to a temperature of about 250° F. and during said cooling operation raising the pressure on said article at least initially to between about 7,000 and about 10,000 pounds per square inch; and thereafter recovering said formed article from said die.

9. A method for forming articles from a plastic composed essentially of polytrifluorochloroethylene having an N. S. T. value of about 300° C., said plastic having been prepared by polymerizing the monomer trifluorochloroethylene at a temperature between about −20° C. and about 25° C., which comprises: placing said plastic in a die; maintaining said die at a temperature between about 480° F. and about 590° F. under compacting pressure between about 700 and about 1,400 pounds per square inch for a time sufficient to permit said plastic to assume the internal contour of said die and attain the size and shape of the desired article; after forming said plastic article in said die in the aforementioned step cooling said article to a temperature of about 250° F. and during said cooling operation raising the pressure on said article at least initially to between about 7,000 and about 10,000 pounds per square inch; and thereafter recovering said formed article from said die.

10. A method for forming articles from a plastic composed essentially of polytrifluorochloroethylene having an N. S. T. value of about 270° C., said plastic having been prepared by polymerizing the monomer trifluorochloroethylene at a temperature between about −20° C. and about 25° C., which comprises: placing said plastic in a die; maintaining said die at a temperature between about 465° F. and about 535° F. under compacting pressure between about 700 and about 1,400 pounds per square inch for a time sufficient to permit said plastic to assume the internal contour of said die and attain the size and shape of the desired article; after forming said plastic article in said die in the aforementioned step cooling said article to a temperature of about 250° F. and during said cooling operation raising the pressure on said article at least initially to between about 7,000 and about 10,000 pounds per square inch; and thereafter recovering said formed article from said die.

11. A method for forming articles from a plastic composed essentially of polytrifluorochloroethylene having an N. S. T. value of about 240° C., said plastic having been prepared by polymerizing the monomer trifluorochloroethylene at a temperature between about $-20°$ C. and about 25° C., which comprises: placing said plastic in a die; maintaining said die at a temperature between about 445° F. and about 500° F. under compacting pressure between about 700 and about 1,400 pounds per square inch for a time sufficient to permit said plastic to assume the internal contour of said die and attain the size and shape of the desired article; after forming said plastic article in said die in the aforementioned step cooling said article to a temperature of about 250° F. and during said cooling operation raising the pressure on said article at least initially to between about 7,000 and about 10,000 pounds per square inch; and thereafter recovering said formed article from said die.

12. A method for forming articles from a plastic polymer of trifluorochloroethylene which comprises placing said plastic in a die, heating said plastic in said die at a predetermined temperature and elevated compacting pressure for a time sufficient to permit said plastic to assume the internal contour of said die and attain the size and shape of the desired article, after forming said plastic article in said die in the aforementioned step cooling said article to a temperature below 350° F. and during said cooling operation raising the pressure on said article at least initially above said last-mentioned compacting pressure, and thereafter recovering said formed article from said die.

LOUIS C. RUBIN.

REFERENCES CITED

The following references are of record in the file of this patent:

UNITED STATES PATENTS

| Number | Name | Date |
|---|---|---|
| 2,232,475 | Renfrew et al. | Feb. 18, 1941 |

FOREIGN PATENTS

| Number | Country | Date |
|---|---|---|
| 578,168 | Great Britain | June 18, 1946 |

OTHER REFERENCES

"New High Temperature Thermoplastic," Modern Plastics, October, 1948, pp. 168, 170 and 172.